United States Patent
Green

[15] 3,672,204
[45] June 27, 1972

[54] TRANSIENT THERMAL METHOD AND MEANS FOR NONDESTRUCTIVELY TESTING A SAMPLE

[72] Inventor: Donald R. Green, Richland, Wash.

[73] Assignee: The United States of America as represented by the United States Atomic Energy Commission

[22] Filed: April 8, 1970

[21] Appl. No.: 26,569

[52] U.S. Cl. .................................................. 73/15 R
[51] Int. Cl. .................................................. G01n 25/00
[58] Field of Search .......................... 73/15; 250/83.31 R

[56] References Cited

UNITED STATES PATENTS

| 3,222,917 | 12/1965 | Roth | 73/15 |
|---|---|---|---|
| 3,165,915 | 1/1965 | Parker et al. | 73/15 |
| 3,433,052 | 3/1969 | Maley | 73/15 |
| 3,206,603 | 9/1965 | Mauro | 250/83.3 |
| 3,427,861 | 2/1969 | Maley | 73/15 |
| 3,439,525 | 4/1969 | Waterman et al. | 73/15.4 |

OTHER PUBLICATIONS

Cezairliyan et al., " Heat speed (subsecond) Measurement of Heat Capacity etc. of Molybdenum in Range 1900 to 2800n" in Journal of Research of The National Bureau of Standards Vol. 74A No. 11 Jan.-Feb. 1970 pg. 65- 67.

Primary Examiner—Richard C. Queisser
Assistant Examiner—Herbert Goldstein
Attorney—Roland A. Anderson

[57] ABSTRACT

A sample is nondestructively tested by generating and transmitting a transient-function heat flux into a surface of the sample and measuring responsive to the heat flux the surface thermal impedance of the sample at the area thereof in contact with heat flux.

23 Claims, 10 Drawing Figures

Inventor
Donald R. Green
Attorney

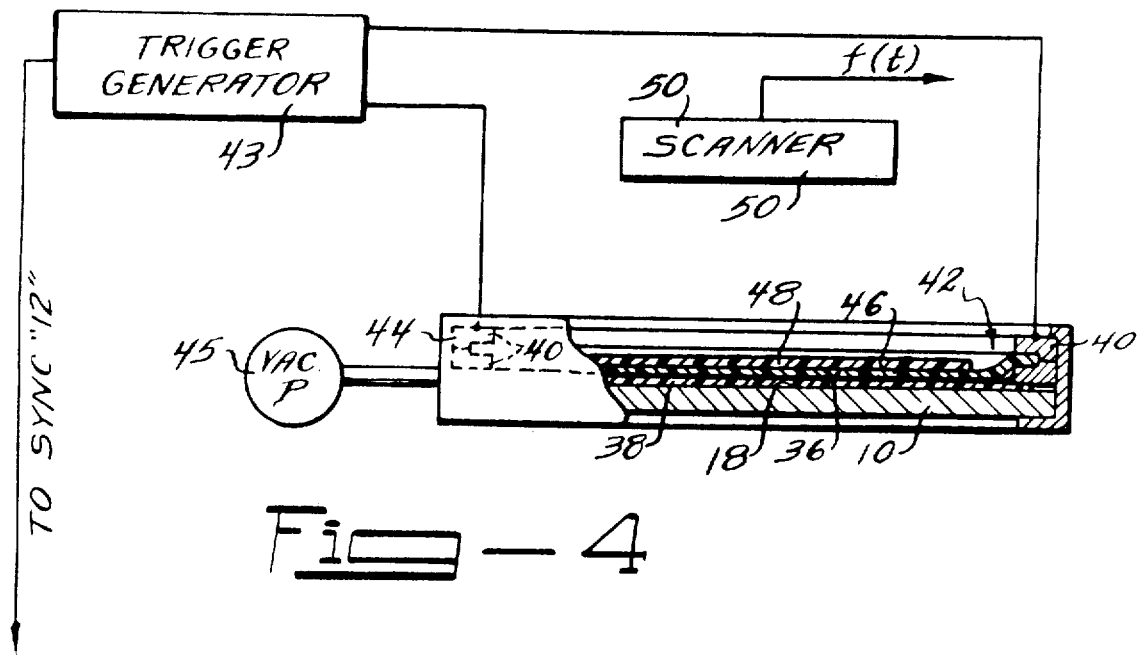
Fig—4
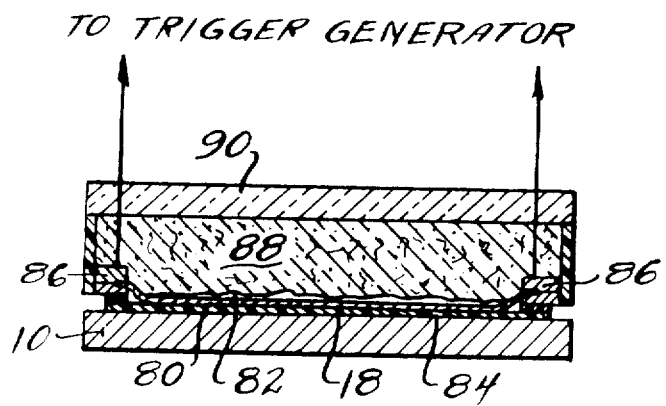
Fig—6
Inventor
Donald R. Green
Attorney

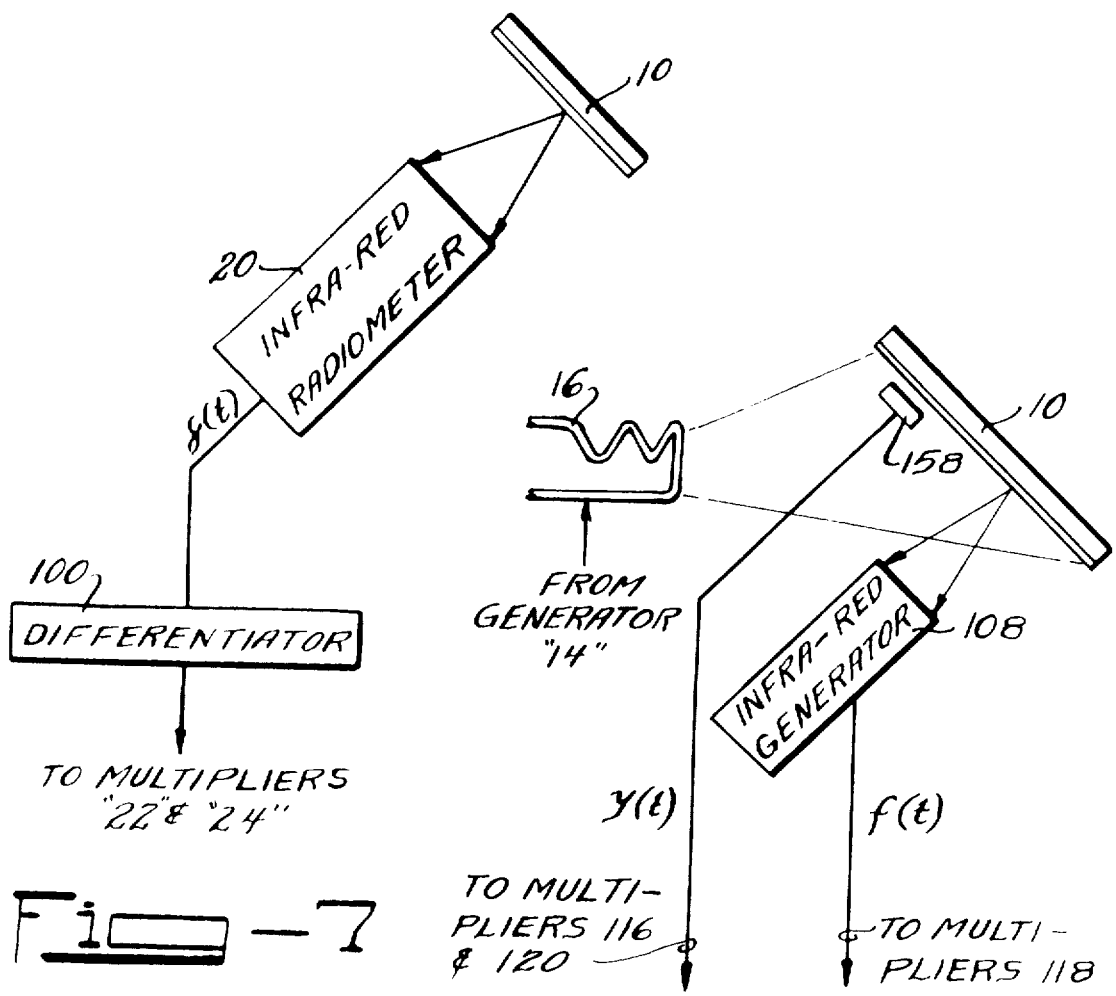

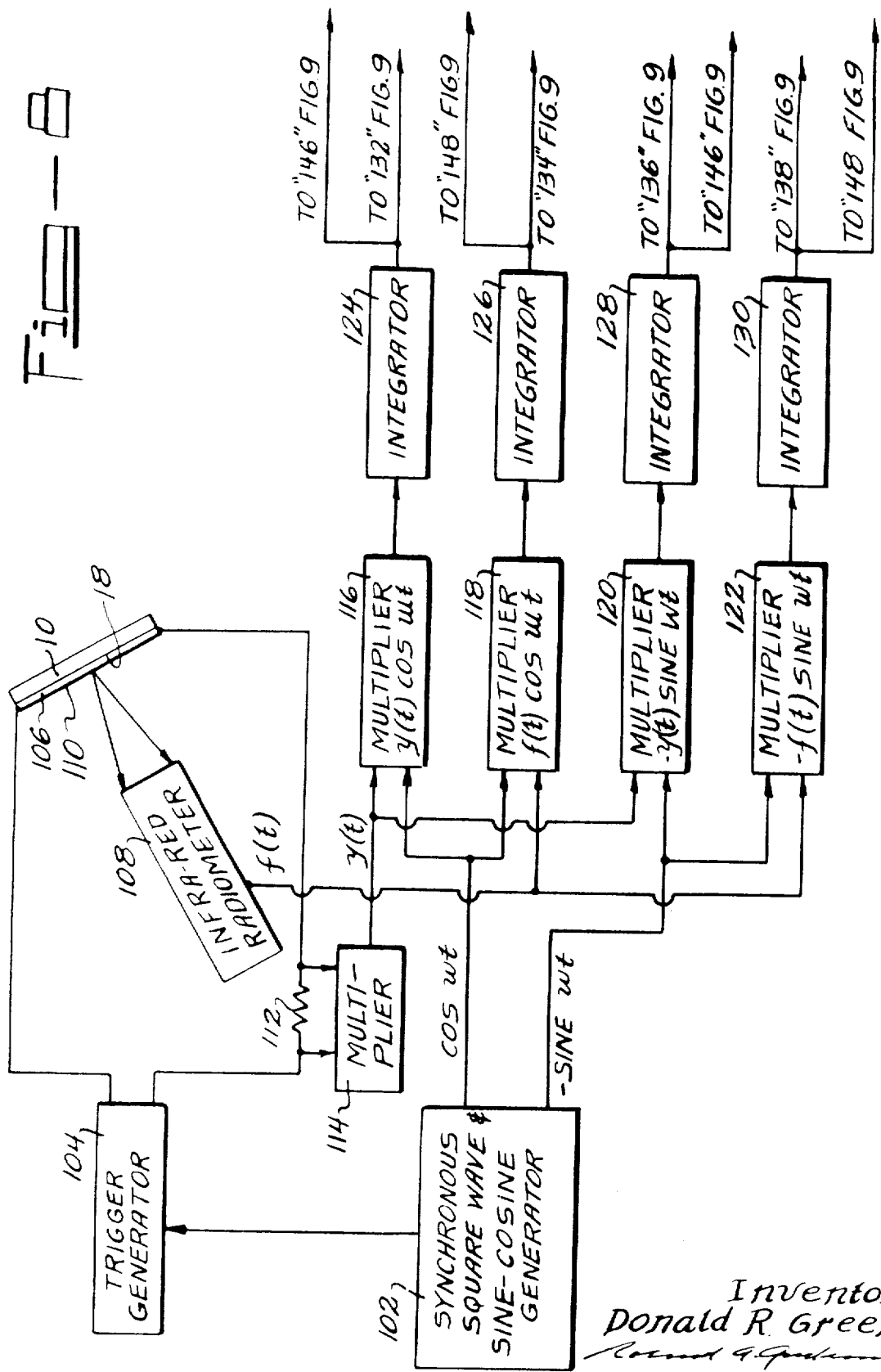

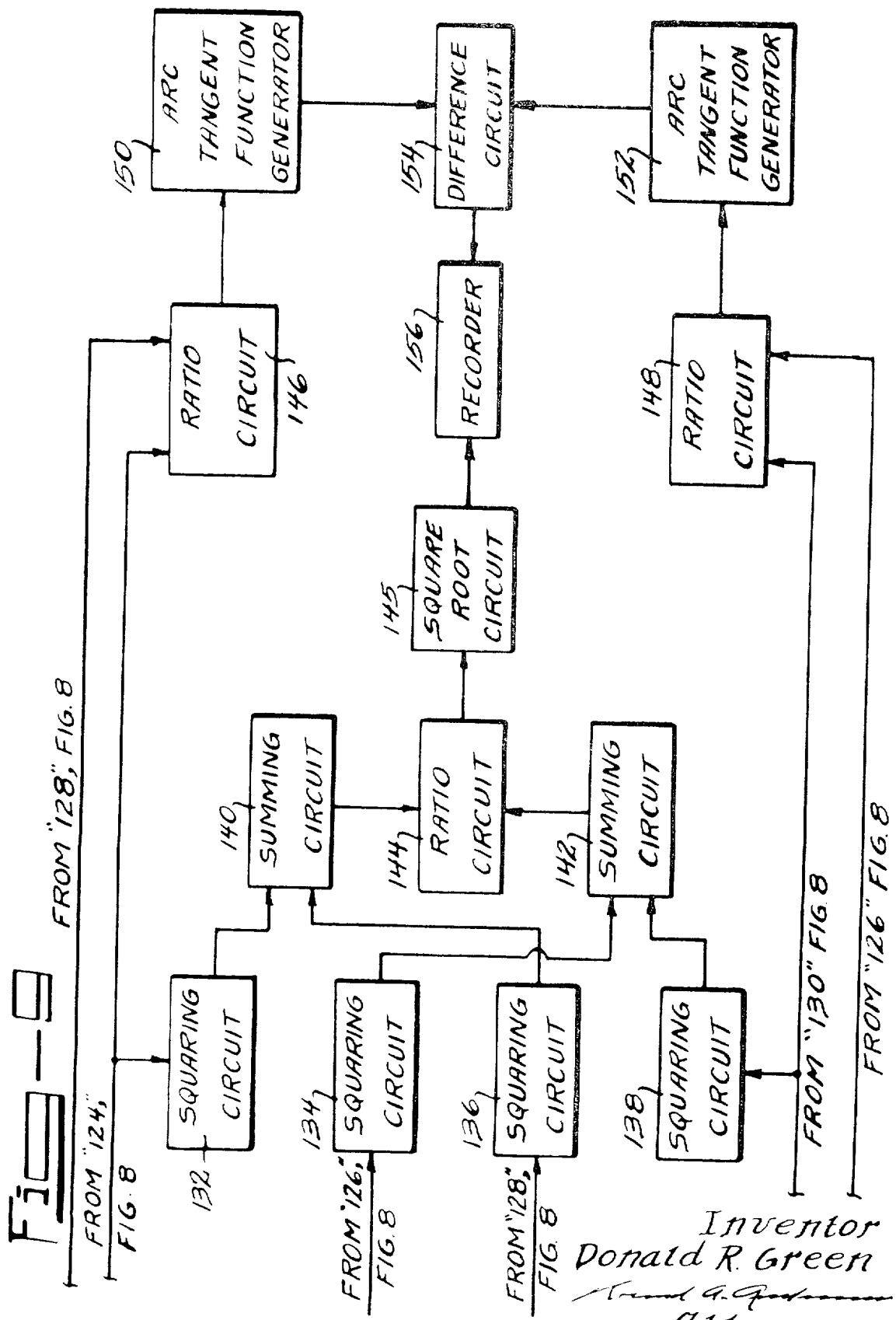

TRANSIENT THERMAL METHOD AND MEANS FOR NONDESTRUCTIVELY TESTING A SAMPLE

CONTRACTUAL ORIGIN OF THE INVENTION

The invention described herein was made in the course of, or under, a contract with the United States Atomic Energy Commission.

BACKGROUND OF THE INVENTION

This invention relates to a method and means for nondestructively testing a sample and more particularly to methods and means utilizing thermal waves for nondestructively testing a sample.

Thermal nondestructive testing can be used to measure the thermal properties of materials at high and low temperatures and to detect flaws that are difficult or impossible to detect by other means. Since all materials conduct heat, thermal waves can be used to nondestructively test insulators, conductors, semiconductors and combinations of materials. Formerly, transient thermal wave methods and means have been used to nondestructively determine the thermal properties of these samples (See T. Z. Harmanthy, "Variable State Methods of Measuring the Thermal Properties of Solids," Journal of Applied Physics, Volume 35, Apr. 1964, page 1190). The prior art transient method and means give accurate results. However, they are only applicable to single layer samples and require either access to two surfaces of a sample or the embedding of thermocouples or heat sources within the samples. In my U.S. Pat. No. 3,533,273, issued Oct. 13, 1970 entitled "Thermal Surface Impedance Method and Means for Nondestructive Testing", I taught the measurement of the surface thermal impedance of a test sample when sinusoidal heat flux is applied thereto to provide a nondestructive measurement of the properties of the sample.

It is one object of the present invention to provide an improved method and means utilizing transient thermal waves for nondestructively testing a sample.

It is another object of the present invention to provide methods and means for measuring the surface thermal impedance of a sample utilizing transient thermal waves.

It is another object of the present invention to provide methods and means utilizing transient thermal waves for nondestructively testing a test sample from only one surface thereof.

It is another object of the present invention to provide methods and means capable of measuring the thermal surface impedance of a test sample remotely from said surface.

It is another object of the present invention to provide methods and means for obtaining a thermal image of a sample.

It is another object of the present invention to provide methods and means utilizing transient thermal waves to provide a thermal image of a test sample.

Other objects of the present invention will become more apparent as the detailed description proceeds.

In general, the present invention comprises a method and means for generating a transient-function heat flux and transmitting the heat flux into a surface of a sample. The surface thermal impedance of the sample responsive to the heat flux is measured at the area of the sample in contact with the heat flux wherefrom a measure of the physical properties of the sample is obtained.

Further understanding of the present invention may be best obtained from consideration of the accompanying drawings wherein:

FIG. 4 is a cutaway sectional view showing a thermal transducer for operation with the embodiment of FIG. 2;

FIG. 6 is a cross sectional view of an alternate transducer for the practice of the present invention;

FIG. 7 is a block diagram of a modification for the practice of the present invention;

FIGS. 8 and 9 are block diagrams of an apparatus for the general practice of the present invention; and FIG. 10 is a block diagram of an apparatus modifying the apparatus of FIG. 8.

DESCRIPTION OF THE PREFERRED EMBODIMENT

The surface thermal impedance of a sample is defined as the ratio of sinusoidal steady state temperature to heat flow at the surface of the sample. For the practice of the present invention, the steady sinusoidal surface thermal impedance $Z(j\omega)$ is related to the transient temperature response, $f(t)$, and the transient heat flow $y(t)$, at the surface of the test sample. This relationship can be expressed as $$Z(j\omega) = \frac{\int_0^\infty f(t) \cos \omega t \, dt - j \int_0^\infty f(t) \sin \omega t \, dt}{\int_0^\infty y(t) \cos \omega t \, dt - j \int_0^\infty y(t) \sin \omega t \, dt} \quad (1)$$

where $t$ is time and $\omega$ is the angular velocity. For the practice of the present invention to effect transient measurements on a sample, the surface of the sample is excited with a known heat flow, $y(t)$, and the sample surface temperature response thereto, $f(t)$, is sensed. Where the heat flow, $y(t)$, is a transient signal of the impulse-function form, the denominator of the above equation becomes unity and the surface thermal impedance of the sample is given by $$Z(j\omega) = \int_0^\infty f(t) \cos \omega t \, dt - j \int_0^\infty f(t) \sin \omega t \, dt \quad (2)$$

Figure 1:
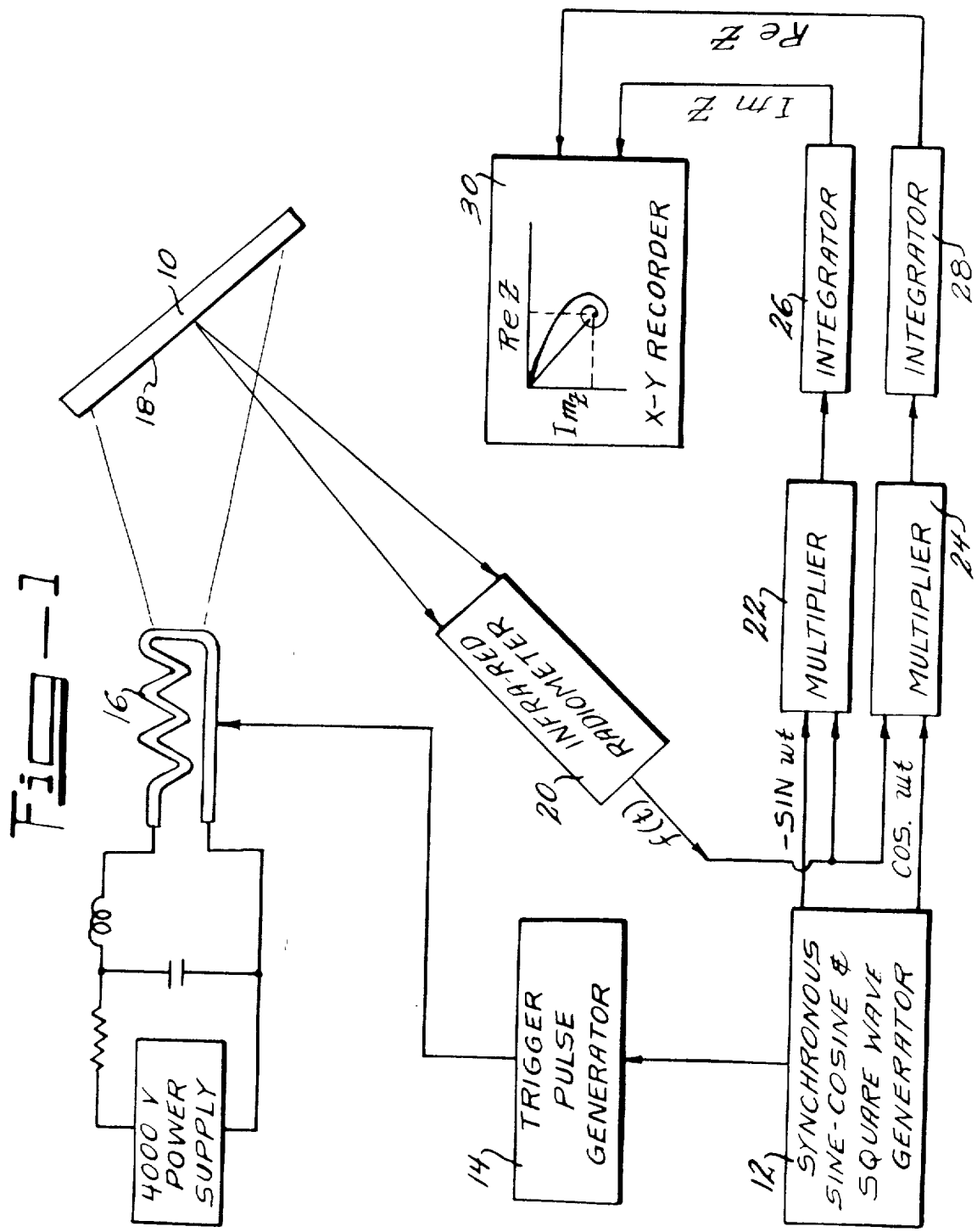
FIG. 1 is a block diagram of an apparatus for the practice of the present invention.

The apparatus illustrated in FIG. 1 effects the above relationship to provide a measure of the surface thermal impedance of sample 10. A synchronous cosine wave, square wave, and negative sine wave generator 12 provides an output to a trigger pulse generator 14. Trigger pulse generator 14 provides an output pulse to energize a high intensity flash lamp 16 whose heat output is directed to the surface 18 of the sample 10. An infrared radiometer 20 is mounted to scan the surface 18 of sample 10 which is subject to the heat flux from flash lamp 16. The output from the radiometer 20 is fed into an input of each of multipliers 22 and 24. The generator 12 generates synchronously with its excitation pulse to generator 14 cosine and negative sine functions which are respectively fed to the other inputs of multipliers 24 and 22. The output of multipliers 22 and 24 are each fed to an associated input of integrators 26 and 28 respectively. The outputs of the integrators 26 and 28 are fed to the inputs of an X-Y recorder 30.

In operation, the pulse from generator 12 excites via trigger generator 14 the flash lamp 16 to provide an impulse-function heat flux into the surface 18 of sample 10. The infrared radiometer scans the surface 18 of sample 10 to provide a continuous signal $f(t)$ whose value is a function of the surface temperature of the sample. The signal $f(t)$ from radiometer 20 is then multiplied by each of the synchronously generated cosine and negative sine functions from generator 12 to provide two output signals, $-f(t) \sin \omega t \, dt$ and $f(t) \cos \omega t \, dt$. These two signals, when integrated by integrators 26 and 28 and combined, provide a measure of the surface thermal impedance of sample 10. In the embodiment of FIG. 1, each integrated signal is fed to an associated axis input of the X-Y recorder 30 to provide a complex plane Argand plot of the surface thermal impedance for sample 10. From this plot, the physical properties of the sample 10 may be ascertained.

It will also be appreciated that other heat flux source means may be substituted for the flash lamp 16 and that such may be excited to provide an impulse-function heat flux into the sample surface. Further, in the practice of the present invention, the term impulse-function heat flux defines a transient heat flux having a time duration approaching zero and an amplitude providing for the heat flux an area equal to a finite value.

Figure 2:
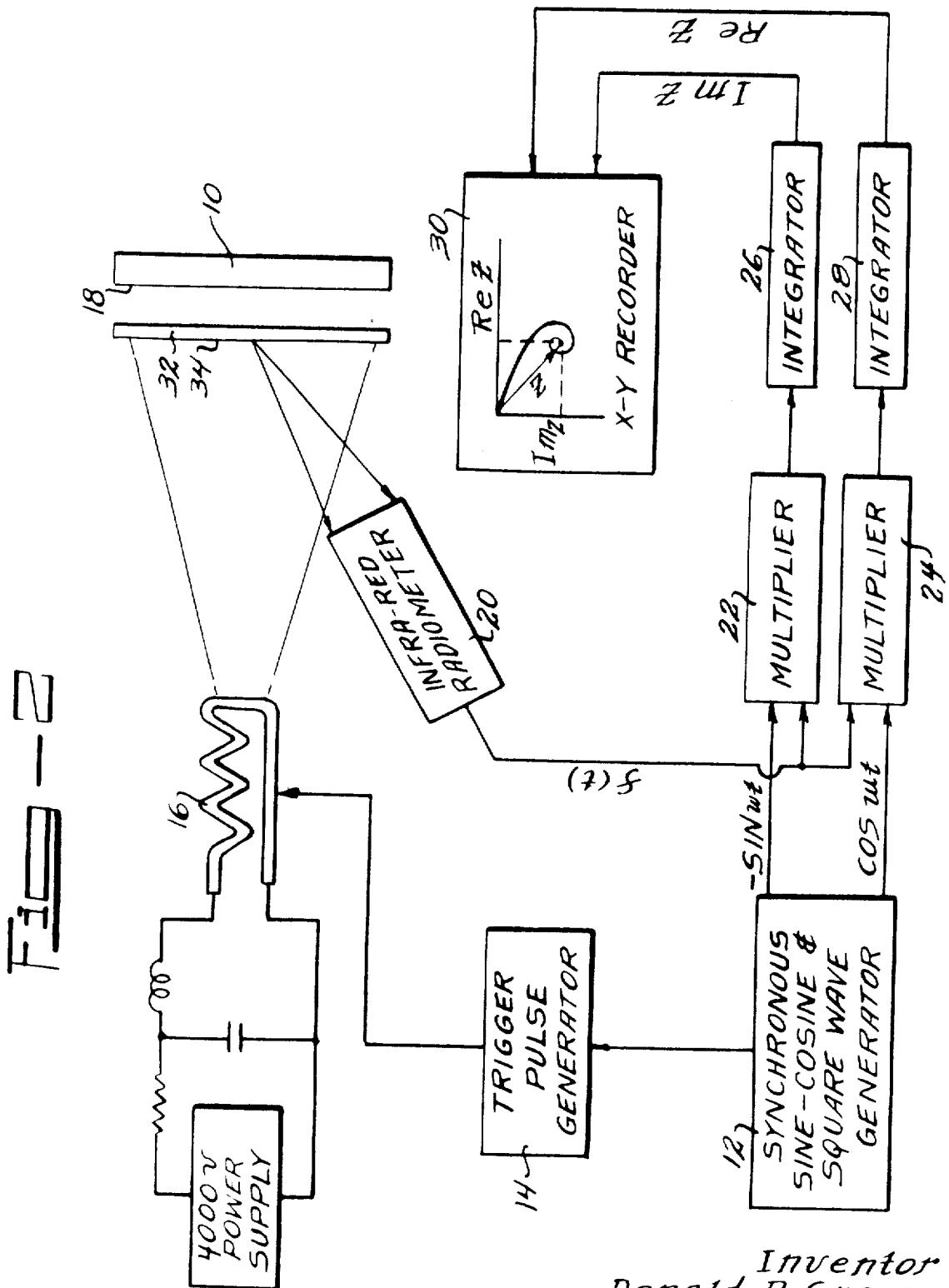
FIG. 2 is a block diagram of a preferred apparatus for the practice of the present invention.

Turning to FIG. 2, the preferred embodiment of an apparatus for the practice of the present invention is illustrated. The embodiment of FIG. 2 is substantially that of FIG. 1, except that a thermal transducer 32 is mounted adjacent the sample 10 and the heat flux is transmitted from the transducer 32 to the surface 18 of sample 10. The flash lamp 16 is mounted so that the radiant energy therefrom strikes the material of the transducer 32 to provide an impulse-function heat flux into the surface 18 of sample 10. The radiometer 20 is the embodiment of FIG. 2 is mounted so that it scans the side 34 of transducer 32 remote from the surface 18 of sample 10. As in the embodiment of FIG. 1, the output of the radiometer $f(t)$ is fed into the inputs of the multipliers 24 and 22 where it is multiplied by the synchronously generated cosine and negative sine function signals. The signal handling techniques and apparatus thereafter are the same as that shown for the apparatus in FIG. 1.

The transducer 32 comprises a thin layer of thermally-responsive material from which the impulse-function heat flux flows into the surface 18 of the sample 10. The temperatures in each region of the material of transducer 32 depend upon the input thermal impedance of that region. The input thermal impedance of each region of the material of transducer 32 is related to both the surface thermal impedance of the surface 18 of sample 10 at a corresponding point thereon and the coupling (lift-off) between the transducer 32 and the surface 18 of sample 10. Further, as in the embodiment of FIG. 1 where the transducer 32 is not in contact with the surface 18 of the sample 10, the obtained signal is also affected by the emissivity of the sample surface.

For the practice of the present invention according to the embodiment of FIG. 2, the transducer 32 should drive the temperature of the surface 18 of the sample 10 rather than being driven by it. This method of operation permits compensation for differences in coupling between the sample surface and the transducer 32. As previously set forth, such coupling differences result from differences in the emittance of the surface 18 of the sample 10 and the spacing and conductance between the transducer 32 and the sample 10.

Figure 3:
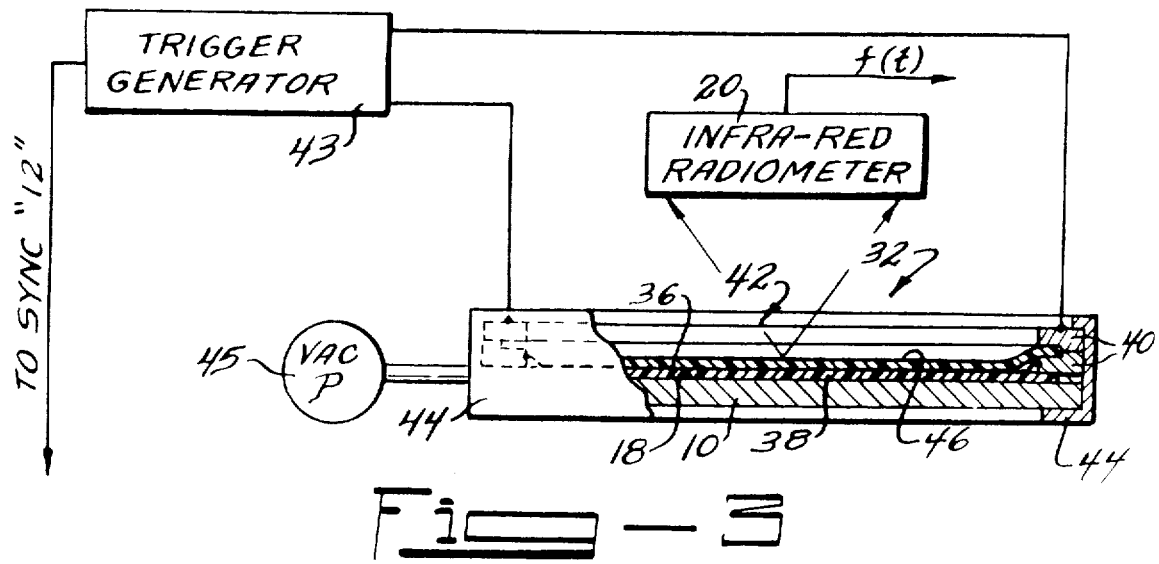
FIG. 3 is a cutaway sectional view showing a thermal transducer for operation with the embodiment of FIG. 2.

To minimize the emittance effect from the surface 18 of sample 10, it is desireable that the transducer 32 contact the surface 18 of the sample 10. To effect such an arrangement, a transducer as shown in FIG. 3 may be used with the apparatus of FIG. 2. Further, it will be appreciated that instead of heating the transducer 32 by flash lamps other apparatus may be used, such as direct heating of an electrically-conductive thermal transducer as shown in the transducer of FIG. 3. In FIG. 3, the transducer comprises a thin electrically-conductive thermally-responsive material 36 and a thermally-transparent electrically-insulating layer 38 interposed between the conductive layer 36 and the surface 18 of sample 10. Electrically-conductive blocks 40 form a perimeter portion of a frame 42 in which the electrically-conductive layer 36 is mounted and to which electrically-insulating layer 38 is attached. The output from a trigger generator 43 is applied to the electrically-conductive blocks 40 to cause a uniform current flow through the layer 36. A vacuum-tight housing 44 engages the blocks 40 and sample 10 to provide an enclosure, which when evacuated by vacuum pump 45, insures positive engagement between the layers 36 and 38 and between layers 38 and surface 18 of sample 10. This positive engagement minimizes the emissivity effects from the surface 18 of sample 10.

With the transducer structure of FIG. 3, the pulse output from the synchronous generator 12 causes trigger generator 43 to pass an impulse-function current uniformly through the electrically-conductive layer 36 wherefrom an impulse-function heat flux is driven into the surface 18 of sample 10. The infrared radiometer 20 scans the back side 46 of the layer 36 to provide a signal function $f(t)$ responsive to the temperature thereof. This signal $f(t)$ is fed to the multipliers 22 and 24 of the embodiment of FIG. 2 and handled in the manner aforedescribed.

It will be appreciated that the temperatures produced in each region of the conductive layer 36 may be measured utilizing apparatus different than that shown in FIG. 3. Such a structure is illustrated in the embodiment of FIG. 4.

In the embodiment of FIG. 4, a thermally-responsive-image-generating coating 48 is deposited on the back side 46 of the layer 36 and the radiometer 20 is replaced by an electron beam scanner 50. In operation, as the temperature of the material 36 changes, the coating 48 produces a visible image by changing color or darkening with increasing or decreasing temperatures. The electron beam scanner 50 detects these image changes to provide an output signal $f(t)$ which is a function of the temperature of the layer 36. The output signal $f(t)$ from the electron beam scanner is fed to the multipliers 22 and 24 shown in FIG. 2 and the signal handled thereafter in the manner hereinbefore described.

It will be appreciated that since both heating and surface temperature detection depend upon radiant energy, such measurements will be affected by the emissivity of the surface 18 of the sample 10. Differences in the emissivity of the surface 18 of the sample 10 will cause in the embodiments of FIGS. 2, 3 and 4 differences in the apparent surface thermal impedance along a unique locus in the Argand plot. Further, variations in coupling (lift-off) between the conductive layer 36 and the surface 18 of sample 10 in the embodiments of FIGS. 2, 3 and 4 generate a unique locus on the complex impedance plane of the Argand plot. Compensation for such values may be effected by known signal handling techniques in a manner analogous to that used to eliminate the effects of lift-off in eddy current probe coils.

It is desirable in the practice of the present invention using the structure of FIGS. 2, 3 and 4 that the electrically-conductive layer 36 be thin enough in cross section so that it has a high-frequency thermal response whereby equilibrium is established quickly for any temperature differences existing between the layer 36 and the surface 18 of sample 10. Thus, it is desirable that the thermal-frequency response for the layer 36 be high enough so that is comes to equilibrium before the heat pattern in the sample 10 changes. The heat capacity of the layer 36 should therefore be low.

Figure 5:
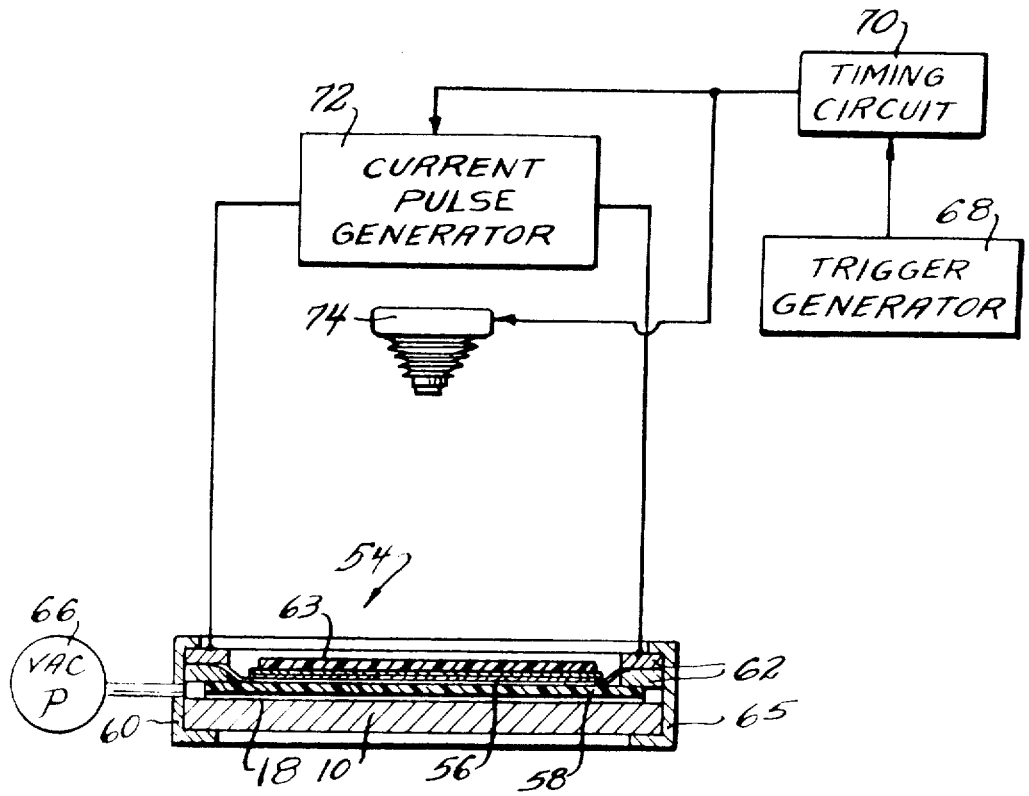
FIG. 5 is a block diagram of an apparatus for the practice of the present invention.

With the electrically-conductive layer 36 transmitting an impulse-function heat flux uniformly over the total surface 18 of the sample 10 covered by it, the present invention also effects the production of a thermal image of the sample 10. The production of the thermal image of the sample 10 and the apparatus necessary therefor is simpler than that heretofore illustrated in the general embodiment of FIGS. 1 and 2. Such an apparatus is illustrated in FIG. 5. In FIG. 5, a thermal transducer 54 similar to that of FIG. 4 is mounted engaging the surface 18 of the sample 10. The thermal transducer 54 comprises a thin electrically-conductive thermally-responsive material 56 and a thermally-transparent electrically-insulating layer 58 disposed between the layer 56 and the surface 18 of the sample 10. The layer 56 and the layer 58 are mounted into and onto a frame 60 whose perimeter is partially formed by electrically-conductive blocks 62. A coating of thermally-responsive-image-generating material 63 is deposited on the back side of layer 56. Coupled to the blocks 62 and the sample 10 is a vacuum-tight housing 65, which when evacuated by a vacuum pump 66, causes a positive engagement between the layer 56 and the layer 58 and between layer 58 and the surface 18 of the sample 10. A trigger generator 68 energizes a timing circuit 70 to drive a current pulse generator 72 and pass an impulse-function current through the conductive blocks 62 and layer 58. This current causes an impulse-function heat flux to flow from the layer 56 uniformly into the surface 18 of sample 10. Responsive to the surface thermal impedance of sample 10, the input thermal impedance and hence temperatures of the layer 56 will change. Changes in the temperature of the regions in the layer 56 will cause associated changes in the image of the conductive layer 63. These image changes may be photographically recorded using a camera 74 which is triggerred synchronously by the timing circuit 70. The photographic thermal image so obtained is a nondestructive image of the physical properties of the sample 10.

It will be appreciated that coupling compensation between the conductive layer 56 and the surface 18 of sample 10 may be effected by accurate timing. In this method, lift-off compensation is predicated on the fact that, after termination of heating, the conductive layer 56 quickly comes to equilibrium with the surface temperature of the sample 10. Thus, where the conductive layer 56 has a thin cross section to provide a high-frequency thermal response so that the conductive layer 56 comes to equilibrium before the heat pattern in the sample 10 changes, equilibrium is established quickly. In this method of operation, the trigger generator 68 generates a signal to provide a step-function heating current which is applied to the conductive layer 56. The timing circuit 70 controls the heating period of layer 56 and triggers the camera 74 responsive thereto to provide a lift-off-independent thermal image of the sample surface temperatures.

As previously indicated, heat flow from the conductive layer 56 is applied to the entire surface of the sample 10 at one time. Since the thermal image can be formed in a fraction of a second, the speed of the test for the practice of the present invention is thus limited by the depth of penetration desired and not by the surface area of the sample. In general, practical limitations restrict the size of a single test measurement to a measurement of 10 feet square. It will be appreciated that larger areas can be tested using a smaller transducer repeatedly until the entire area has been covered.

The aforedescribed structures and methods have been successfully used to nondestructively determine the physical properties of samples having various compositions, such as carbon-carbon composite materials, fiberglass-epoxy structures, ceramics, epoxy bonded honeycomb panels having a skin of 0.018-inch thick aluminum and a core of 0.005-inch thick aluminum, and metal to ceramic bonds. For such tests, the transducers heretofore described were manufactured using an electrically conductive layer of 0.001-inch thick Nilvar foil coated with a thermographic phosphor and a 0.001-inch thick layer of electrically-insulating plastic between the foil and the test sample surface. It will be appreciated that other materials may be used in the transducers and the present invention is not to be limited to those described above.

An alternate transducer which may be utilized with the apparatus heretofore described is illustrated in FIG. 6. This transducer is essentially the same as that previously described, except that it does not utilize the vacuum technique to insure positive engagement between the transducer and the surface of the test sample. The transducer of FIG. 6 comprises a thermally-responsive electrically-conductive layer 80 having a backing coating 82 of thermally-responsive-image-generating material and an electrically-insulating thermally-transparent material 84 disposed between the layer 80 and the surface 18 of sample 10. The electrically-conductive layer 80 and insulating layer 84 are mounted in and to a pair of electrically-conductive end clamps 86. A flexible light-transparent backing material 88, such as silicone rubber, is disposed about the end clamps in contact with the image-generating material 82. The material 88 is flexible to permit the electrically-conductive layer 80 to conform to normal variations in the surface contour of the sample 10. A glass plate support member 90 is mounted to the end clamps 86 to facilitate handling of the transducer and to provide a pressure bearing surface to insure intimate thermal contact between the layer 80, material 84, and surface 18.

It will be appreciated that the aforedescribed apparatus and methods have been effected for the practice of the present invention utilizing the transient-function heat flux of an impulse-function form applied to the surface 18 of the test sample 10 or to the transducer mounted adjacent thereto. The impulse-function heat flux as hereinbefore described causes the denominator of Equation 1 to become unity. Where the transient-function heat flux is of a step-function form, and is applied to either the surface 18 of sample 10 or to a transducer mounted adjacent thereto, it is necessary for the measurement of the surface thermal impedance of the sample that the output from the infrared radiometer 20 be differentiated prior to insertion in the multipliers 22 and 24 in order that the denominator of Equation 1 becomes unity. This may be further appreciated by referring to the modifying apparatus illustrated in FIG. 7.

In FIG. 7, the output from the infrared radiometer 20 is fed to a differentiator 100. The output from differentiator 100 is then fed to the multipliers 22 and 24 for the aforedescribed embodiments. With a step-function heat flux applied to the surface 18 of sample 10 or to the transducer mounted adjacent thereto, differentiation of the output of infrared radiometer 20 prior to insertion in the multipliers 22 and 24 will insure that the denominator of Equation 1 becomes unity as for the case of the applied impulse-function heat flux. The processing of the signal and apparatus therefore otherwise remain unchanged.

Where a transient heat flux is applied to the surface 18 of the sample 10 or to a transducer mounted adjacent thereto which does not effect a unity value for the denominator of Equation 1, then cosine-and sine-functions of the heat flux have to be measured, integrated, and combined to effect a solution for the surface thermal impedance of the test sample according to Equation 1.

The apparatus illustrated in FIGS. 8 and 9 is for the general practice of the present invention where a transient heat flux is applied which does not effect a unity denominator for Equation 1. In FIG. 8, a synchronous sine, cosine and square wave generator 102 drives a trigger generator 104 which is electrically connected to a thermal transducer 106 mounted adjacent to or in contact with the surface 18 of sample 10 as hereinbefore described for the preceding embodiments. An infrared radiometer 108 scans the surface 110 of the transducer 106 to detect the surface temperature thereof. The output of the infrared radiometer 108 is a continuous signal $f(t)$ whose value is a function of the surface temperature of the transducer 106. A resistor 112 is inserted in the output of the trigger generator 104 and a multiplier circuit 114 connected thereto to produce a product of the voltage across and the current through the resistor 112 and effect a measure of the transient-heat flux into the transducer 106. The output of the multiplier circuit 114 is therefore a signal $Y(t)$ whose value is a function of the transient-heat flux applied to the transducer 106.

The synchronous generator 102 provides a cosine $\omega t$ output signal and a negative sine $\omega t$ signal. These signals are fed to the input of associated multiplier circuits 116, 118, 120, 122, the cosine $\omega t$ signal going to the input of multipliers 116 and 118 and the $-$sine $\omega t$ signals going to the input of multipliers 120 and 122. The heat-flux function signal $y(t)$ output from the multiplier circuit 114 is fed to the input of multipliers 116 and 120. The temperature-function signal $f(t)$ from radiometer 108 is fed to the input of multiplier circuits 118 and 122. The outputs from the multiplier circuits 116 through 122 are fed respectively to an associated input of integrators 124 through 130. The outputs from the integrators 124 through 130 are squared in associated squaring circuits 132 through 138 and then fed to the input of summing circuits 140 and 142, the outputs from squaring circuits 132 and 136 being fed to summing circuit 140 and the outputs from squaring circuits 134 and 138 being fed to input of summing circuit 142. A ratio circuit 144 takes the ratio of the output of summing circuit 142 to the output of summing circuit 140 to provide an output which is a function of the square of the amplitude of the input thermal impedance of transducer 106. A square foot circuit 145 takes the square root of the output of ratio circuit 144 to provide a signal whose amplitude is a measure of the input thermal impedance of the transducer 106.

The outputs of the integrators 124 and 128 are also fed to a ratio circuit 146 and the outputs of integrators 126 and 130 to a ratio circuit 148. The outputs of ratio circuits of 146 and 148 are fed through associated conventional arc tangent function generators 150 and 152 to a difference circuit 154 whose resultant output is a function of the phase angle of the input thermal impedance of the transducer 106. The amplitude and phase function outputs from the square root circuit 145 and difference circuit 154 are fed to a recorder 156. The multiplied cosine and sine heat-flux functions are then integrated, squared, and summed as are the multiplied cosine and sine surface-temperature functions. The summed sine, cosine surface-temperature functions are then divided by the summed cosine sine heat-flux functions and the square root of the ratio taken to provide a measure of the amplitude value of the input thermal impedance of the transducer 106. The integrated sine heat-flux function is also divided by the integrated cosine heat-flux function to provide a ratio thereof and the sine surface-temperature function is divided by the cosine surface-temperature function to provide a ratio thereof. The arc tangent of each of these ratios is obtained and the arc tangent of the heat-flux function is subtracted from the arc tangent of the surface-temperature function to provide a measure of the phase angle of the input thermal impedance of transducer 106. The phase angle and amplitude values so obtained may be combined in the recorder 156 to provide a measure of the input thermal impedance of the transducer 106 and hence the surface thermal impedance of the test sample.

In operation, the pulse from generator 102 excites the trigger generator 104 to pass a transient-function current uniformly through the transducer 106. This current provides a transient heat pulse into the surface 18 of sample 10 in the manner hereinbefore described for the foregoing embodiments. The infrared radiometer 108 scans the surface 110 of transducer 106 to provide a signal function $f(t)$ responsive to the surface temperature of the transducer 106. This transducer surface temperature signal $f(t)$ is fed to multipliers 118 and 122 where it is multiplied respectively with the cosine $\omega t$ function and $-$sine $\omega t$ function from generator 102. The resistor 112 and multiplier circuit 114 provide the product measurement of current flow through the resistor and voltage across the resistor which is a measure of the transient-heat flux into the transducer 110. The output from the multiplier circuit 114, a measure of the transient heat flux $y(t)$, is fed to the multiplier circuits 116 and 120 where it is multiplied with the cosine $\omega t$ and $-$sine $\omega t$ functions from generator 102.

It will be appreciated that the apparatus and method of the embodiment of FIGS. 8 and 9 are operable with the transducer structures hereinbefore described for the practice of the present invention. Where the transducer utilizes a thermally-responsive-image-generating material as in the transducer of FIG. 4, the infrared scanner 108 is replaced by an electron beam scanner to provide an output temperature signal $f(t)$.

Further, the circuitry of FIGS. 8 and 9 may be also applied to the case where remote heating of the surface 18 of sample 10 or the transducer 106 is affected as in the embodiments in FIGs. 1 and 2 hereinbefore described. In such a case, a photodetector is mounted adjacent to the transducer or sample surface being irradiated to provide a measure of the transient-heat flux being transmitted thereinto. The output of the photodetector is fed to the multipliers 116 and 120 and signal handling techniques thereafter remain the same as for the embodiment of FIGS. 8 and 9. This alternate heat flux measuring technique is illustrated in FIG. 10 wherein is shown a photodetector 158 mounted adjacent to the surface of a sample or a transducer being irradiated with a transient-heat flux to provide a measure of the transient-heat flux $y(t)$ being received.

Persons skilled in the art will, of course, readily adapt the teachings of the present invention to embodiments and methods far different from those illustrated and described above. Accordingly, the present invention should only be limited in accordance with the appended claims.

The embodiments of the invention in which an exclusive property or privilege is claimed are defined as follows:

1. A method for nondestructively testing a sample comprising generating a transient-function heat flux, transmitting said heat flux into said sample, determining responsive to said heat flux the transient surface temperature of said sample at the area thereof in contact with said heat flux, and measuring from said heat flux and said determined transient surface temperature the surface thermal impedance of said sample to provide a measure of the physical properties of said sample.

2. The method according to claim 1 wherein the generation and transmission of said transient-function heat flux and the measurement of said surface thermal impedance comprises generating an impulse-function heat flux, transmitting said heat flux into said sample, generating synchronously with said impulse-function heat flux sine- and cosine-function signals, multiplying said generated sine-function signal and said measured transient surface temperature to obtain a first output signal, multiplying said generated cosine-function signal and said measured transient surface temperature to obtain a second output signal, and integrating said first and second output signals, which first and second integrated output signals provide a measure of the complex values of the surface thermal impedance of said sample.

3. The method according to claim 1 wherein the generation and transmission of said transient-function heat flux and the measurement of said surface thermal impedance comprises generating a step-function heat flux, transmitting said heat flux into said sample, differentiating said measured transient surface temperature, generating synchronously with said transient-function heat flux sine- and cosine-function signals, multiplying said generated sine-function signal and said measured differentiated transient surface temperature to obtain a first output signal, multiplying said generated cosine-function signal and said measured differentiated transient surface temperature to obtain a second output signal, and integrating said first and second output signals, which integrated signals are a measure of the complex values of the surface thermal impedance of said sample.

4. The method according to claim 1 wherein said surface thermal impedance measurement comprises measuring the value of said transient-function heat flux applied to the surface of said sample, generating synchronously with said transient-heat flux sine- and cosine-function signals, multiplying and integrating said cosine-function signal and said measured transient-function heat flux to provide a first output signal, multiplying and integrating said cosine-function signal and said measured transient surface temperature to provide a second output signal, multiplying and integrating said sine-function signal and said measured transient-function heat flux to provide a third output signal, multiplying and integrating said sine-function signal and said measured transient surface temperature to provide a fourth output signal, squaring said first, second, third and fourth output signals, summing said first and third squared output signals, summing said second and fourth squared output signals, dividing the summed second and fourth squared output signals by the summed first and third squared output signals to provide a first-ratio measure, measuring the square root value of said first-ratio measure, dividing said third output signal by said first output signal to provide a second-ratio measure thereof, dividing said fourth output signal by said second output signal to provide a third-ratio measure thereof, measuring the arc tangent of each said second and third-ratio measures, the subtracting the third-ratio measure arc-tangent value from the second-ratio measure arc-tangent value to provide a measure of the phase angle of the surface thermal impedance of said sample, said square root value of said first-ratio measure being a measure of the amplitude of the surface thermal impedance of said sample.

5. A method for nondestructively testing a sample comprising mounting a thermal transducer adjacent a surface of said sample, exciting said transducer to transmit a transient-function heat flux into the surface of said sample, measuring responsive to said transient-function heat flux the transient surface temperature of said transducer opposite the side thereof adjacent said sample, and measuring from said heat flux and said measured transient surface temperature the input thermal impedance of said transducer to provide a measure of the surface thermal impedance of said sample at the area thereof in contact with said heat flux from said transducer and hence the physical properties of said sample.

6. The method according to claim 5 wherein exciting said transducer to transmit a transient-function heat flux into the surface of said sample and the measurement of said input thermal impedance of said transducer comprises exciting said transducer to transmit an impulse-function heat flux into the surface of said sample, generating synchronously with said impulse-function flux generation sine- and cosine-function signals, multiplying said sine-function signal and said measured transducer transient surface temperature to provide a first output signal, multiplying said cosine-function signal and said measured transducer transient surface temperature to provide a second output signal, and integrating said first and second output signals, which integrated first and second output signals provide a measure of the complex values of the surface thermal impedance of said sample.

7. The method according to claim 5 wherein exciting said transducer to transmit a transient-function heat flux into the surface of said sample and the measurement of said input thermal impedance of said transducer comprises exciting said transducer to transmit a step-function heat flux into the surface of said sample, generating synchronously with said step-function heat flux generation sine- and cosine-function signals, differentiating said measured transducer transient surface temperature, multiplying said sine-function signal and said differentiated measured transducer transient surface temperature to provide a first output signal, multiplying said cosine-function signal and said differentiated measured transducer transient surface temperature to provide a second output signal, and integrating said first and second output signals, which integrated first and second output signals provide a measure of the complex values of the surface thermal impedance of said sample.

8. The method according to claim 5 wherein said thermal transducer is mounted engaging the surface of said sample in intimate contact therewith to optimize thermal coupling between said sample and said transducer.

9. The method according to claim 5 wherein said transducer input thermal impedance measurement comprises measuring the excitation power applied to said transducer to transmit said transient heat flux to said sample, generating synchronously with said transient heat flux sine- and cosine-function signals, multiplying and integrating said cosine-function signal and said measured transducer excitation power to provide a first output signal, multiplying and integrating said cosine-function signal and said measured transducer transient surface temperature to provide a second output signal, multiplying and integrating and sine-function signal and said measured transducer exciting power to provide a third output signal, multiplying and integrating said sine-function signal and said measured transducer transient surface temperature to provide a fourth output signal, squaring said first, second, third and fourth output signals, summing said first and third squared output signals, summing said second and fourth squared output signals, dividing the summed second and fourth squared output signals by the summed first and third squared output signals to provide a first-ratio measure, measuring the square root value of said first-ratio measure, dividing said third output signal by said first output signal to provide a second-ratio measure thereof, dividing said fourth output signal by said second output signal to provide a third-ratio measure thereof, measuring the arc tangent of each said second and third-ratio measures, and subtracting the third-ratio measure arc-tangent value from the second-ratio measure arc-tangent value to provide a measure of the phase angle of the input thermal impedance of said transducer, said square root value of said first-ratio measure being a measure of the amplitude of the input thermal impedance of said transducer.

10. A method for nondestructively testing a sample comprising mounting a thermal transducer adjacent said sample, exciting said transducer to transmit a transient-function heat flux into a surface of said sample, and measuring responsive to said heat flux the transient thermal image of said transducer at the area thereof adjacent the sample surface in contact with said transient heat flux.

11. An apparatus for nondestructively testing a sample comprising means for generating and transmitting a transient-function heat flux into said sample, means responsive to said heat flux for measuring the transient surface temperature of said sample at the area thereof in contact with said heat flux, and means for measuring from said heat flux and said measured transient surface temperature the surface thermal impedance of said sample and hence the physical properties of said sample.

12. The apparatus according to claim 11 wherein said transient heat flux means generate and transmit an impulse-fraction heat flux into said sample, and said surface thermal impedance measuring means comprise means for generating sine- and cosine-functions synchronously with said impulse-function heat flux means, means for multiplying each of said sine- and cosine-functions with said measured transient surface temperature to provide first and second output signals, and means for integrating said first and second output signals, which integrated first and second output signals provide a measure of the complex values of the surface thermal impedance of said sample.

13. The apparatus according to claim 11 wherein said transient-function heat flux means generate and transmit a step-function heat flux into said sample and wherein said surface thermal impedance measuring means comprise means for generating cosine- and sine-functions synchronously with said step-function heat-flux means, a differentiator connected to differentiate the measured transient surface temperature, means for multiplying each of said generated sine- and cosine-functions with said differentiated measured transient surface temperature to provide first and second output signals, and an integrator connected to integrate said first and second output signals, which integrated first and second output signals are a measure of the complex values of the surface thermal impedance of said sample.

14. An apparatus for nondestructively testing a sample comprising a thermal transducer mounted adjacent said sample, means for exciting said transducer to transmit a transient-function heat flux into said sample, means for measuring responsive to said transient-function heat flux the transient surface temperature of said transducer opposite the side thereof adjacent said sample, and means for measuring from said heat flux and said measured transient surface temperature the input thermal impedance of said transducer to provide a measure of the surface thermal impedance of said sample in contact with said heat flux and hence the physical properties of said sample.

15. The apparatus according to claim 14 wherein said transducer comprises a layer of material having a high-frequency thermal response to provide optimal thermal equilibrium between said material and said sample surface a minimal time after application of said transient-function heat flux.

16. The apparatus according to claim 14 wherein said transducer is mounted contiguous to said surface of said sample and comprises a thin layer of electrically conductive material, and an electrical insulator between said conductive layer and said sample surface.

17. The apparatus according to claim 16 wherein said transducer exciting means comprise means for applying a transient-function signal across said electrically conductive material to pass a transient-function current therethrough.

18. The apparatus according to claim 16 further including evacuative means engaging said transducer and said sample to provide positive engagement with said transducer and said surface of said sample.

19. The apparatus according to claim 14 wherein said transducer comprises a thermally-responsive-image-generating material, and a high-frequency-thermally-responsive material mounted between said image-generating material and said surface of said sample contiguous to said image-generating material and proximate said sample surface.

20. The apparatus according to claim 19 wherein said high-frequency-thermal material is electrically conductive and said transducer exciting means comprise thermally-transparent means electrically insulating said high-frequency-thermal material from said sample surface, and means for generating a transient-function current flow uniformly through said high-frequency-thermal material.

21. An apparatus for nondestructively testing a sample comprising a thermal transducer, means for exciting said transducer to transmit a transient-function heat flux into a surface of said sample, said transducer including a layer of material having a high-frequency thermal response to provide optimal thermal equilibrium between said layer material and said sample a minimal time after application of said transient-function heat flux to said sample surface, a thermally-responsive-image-generating material mounted to sense responsive to said transient-function heat flux the temperature of said high-frequency thermal layer, and means for recording the thermal image of said image material, which recorded image is a measure of the thermal image of said sample surface at the area thereof in contact with said heat flux.

22. An apparatus for nondestructively testing a sample comprising a thermally-responsive-image-generating material, a high-frequency-thermally-responsive material mounted contiguous to said image-generating material and proximate said sample surface, means for exciting said high-frequency-thermally-responsive material to transmit a transient-function heat flux therefrom to said sample surface, and means for recording the thermal image generated by said image-generating material responsive to said transient-function heat flux, which recorded image is a measure of the thermal image of said sample surface at the area thereof in contact with said heat flux.

23. The apparatus according to claim 22 wherein said material exciting means comprise said high-frequency-thermally-responsive material being electrically conductive, means for generating a transient-function current uniformly through said high-frequency-thermally-responsive material, and means interposed of said high-frequency-thermally-responsive material and said sample surface to effect electrical isolation therebetween.

* * * * *